United States Patent
Steiner

(10) Patent No.: US 10,638,873 B2
(45) Date of Patent: May 5, 2020

(54) METHOD FOR GENERATING MILK FROTH

(71) Applicant: Steiner AG Weggis, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 149 days.

(21) Appl. No.: 15/561,310

(22) PCT Filed: Mar. 11, 2016

(86) PCT No.: PCT/EP2016/055334
§ 371 (c)(1),
(2) Date: Sep. 25, 2017

(87) PCT Pub. No.: WO2016/150731
PCT Pub. Date: Sep. 29, 2016

(65) Prior Publication Data
US 2018/0098659 A1    Apr. 12, 2018

(30) Foreign Application Priority Data
Mar. 26, 2015   (CH) ....................................... 0439/15

(51) Int. Cl.
*A47J 31/44*      (2006.01)
*A23C 9/152*     (2006.01)

(52) U.S. Cl.
CPC .......... *A47J 31/4489* (2013.01); *A23C 9/1524* (2013.01); *A23C 2210/30* (2013.01)

(58) Field of Classification Search
None
See application file for complete search history.

(56) References Cited

U.S. PATENT DOCUMENTS

| 4,800,805 A | 1/1989 | Mahlich et al. |
| 5,769,135 A | 6/1998 | Mahlich |
| (Continued) | | |

FOREIGN PATENT DOCUMENTS

| DE | 29502594 U1 | 4/1995 |
| EP | 1501398 B1 | 9/2006 |
| (Continued) | | |

OTHER PUBLICATIONS

Abstract of WO 2011 151871.
(Continued)

*Primary Examiner* — Viren A Thakur
(74) *Attorney, Agent, or Firm* — Brian Roffe

(57) ABSTRACT

Using a steam lance, the water vapor and compressed air are supplied to the milk via two pipelines which are separated from one another up to the outlet from the steam lance, wherein only steam is supplied through the outer pipeline at a vapor velocity necessary for breaking up the protein molecules of the milk, whereas a steam-air mixture is supplied through the inner pipeline to enrich the milk with the necessary air proportion, and is only mixed with the steam from the outer pipeline in the milk to be frothed. The steam lance includes the two pipelines arranged coaxially to one another, and an end piece which separates them from one another in the outlet area and has outlet openings for the two media, the steam and the steam-air mixture, designed as radial nozzles which are inclined horizontally and also relative to one another.

12 Claims, 4 Drawing Sheets

(56) References Cited

U.S. PATENT DOCUMENTS

| | | | |
|---|---|---|---|
| 6,840,163 B2 | 1/2005 | Oldani et al. | |
| 6,901,848 B2 | 6/2005 | Beretta | |
| 7,489,860 B2 | 2/2009 | Start | |
| 8,925,441 B2 | 1/2015 | Steiner | |
| 9,532,678 B2 | 1/2017 | Steiner | |
| 9,622,618 B2 | 4/2017 | Steiner | |
| 2003/0089244 A1* | 5/2003 | Imboden | A47J 31/4485 99/453 |
| 2005/0005780 A1* | 1/2005 | Beretta | A47J 31/4489 99/453 |
| 2005/0118319 A1 | 6/2005 | Green et al. | |
| 2006/0272516 A1* | 12/2006 | Carbonini | A47J 31/4489 99/452 |
| 2007/0089612 A1* | 4/2007 | Coccia | A47J 31/4489 99/279 |
| 2014/0197554 A1* | 7/2014 | Bonsch | A47J 31/4485 261/37 |
| 2015/0335195 A1 | 11/2015 | Beaudot et al. | |
| 2015/0335196 A1 | 11/2015 | Beaudot et al. | |
| 2017/0055763 A1 | 3/2017 | Buettiker et al. | |
| 2018/0353001 A1* | 12/2018 | Rotta | A47J 31/4489 |

FOREIGN PATENT DOCUMENTS

| | | | | |
|---|---|---|---|---|
| EP | 2606783 | A1 | 6/2013 | |
| FR | 2604077 | A1 | 3/1988 | |
| WO | 2011151871 | A1 | 12/2011 | |
| WO | WO-2011151871 | A1 * | 12/2011 | A47J 31/4489 |
| WO | 2016150731 | A1 | 9/2016 | |

OTHER PUBLICATIONS

Abstract of EP 2606783.

First Office Action for Chinese Patent Application No. 2016800182011, dated Mar. 21, 2019.

* cited by examiner

METHOD FOR GENERATING MILK FROTH

FIELD OF THE INVENTION

The invention relates to a method and to a device for generating milk froth, in particular for the preparation of drinks that contain milk froth in a coffee machine or a similar device, the media of water vapor and compressed air being supplied to the milk via a steam lance immersed in the milk

BACKGROUND OF THE INVENTION

A device of this type is disclosed by EP-A-1 501 398. It consists essentially of a steam generator and a compressed air source, as well as of a steam supply line and a compressed air supply line connected to the latter and which is continued by the steam lance immersed in the milk. Therefore, the two media of steam and air are already mixed before the steam lance. Consequently, it is difficult to adapt the quality of the milk froth and to change it according to the type of drink to be prepared. Nowadays, devices of this type must satisfy high demands with regard to product quality although their conditions of use and operation often vary considerably from case to case.

OBJECTS AND SUMMARY OF THE INVENTION

In contrast, the object underlying the invention is to avoid these disadvantages and to devise a method and a steam lance of the type specified at the start which automatically guarantee constantly optimal milk froth quality with easy operation of the device.

According to the invention, this object is achieved by a method for generating milk froth in which steam is supplied through a first supply line to an outlet from a steam lance immersed in milk, and a mixture of steam and air I supplied through a second supply line to the outlet from the steam lance, the second supply line being separated from the first supply line up to the outlet from the steam lance such that the steam/air mixture from the second supply line is only mixed with the steam from the first supply line in the milk, and by a steam lance for implementing the method which includes at least two pipelines and an end piece with outlet openings for media conveyed through the steam lance, preferably only steam being supplied by the one pipeline, and a steam/air mixture by the other pipeline, and the outlet openings being designed such that the media passing out of them collide immediately after leaving the steam lance.

The protein in the milk is mainly responsible for the frothing of the milk. The rapid injection of the steam into the milk breaks up the protein molecules and makes the milk viscid, the faster the steam is injected, the finer the air bubbles that are formed. The invention utilizes this knowledge by steam being injected with the vapor velocity required to break up the protein molecules, and at the same time a steam/air mixture being supplied with the proportion of air required to form the air bubbles. Since the two media are only mixed with one another in the milk, their direct interaction within the product is ensured.

In order to optimize this interaction, the invention makes provision such that the media passing out of the steam lance collide immediately after leaving the steam lance, the colliding effect bringing about optimized mixing of the air bubbles with the protein molecules of the milk that is to be frothed.

The method according to the invention is particularly suitable for the manually implemented but almost automatically controlled generation of milk froth. For this purpose, provision is made according to the invention such that the supply of steam and steam and air is controlled time- and temperature-dependently, in a first phase both the steam and the steam/air supply line being active, whereas in a second phase only steam being supplied to the milk by means of the steam supply line.

It is particularly advantageous here if the steam/air supply line is activated cyclically in the first phase, in each cycle the ratio between the active and the inactive period preferably being three to one. The cyclical change improves the swirl of the milk so that the air bubbles on the surface of the milk are destroyed and so a homogeneous milk froth with fine pores is achieved, the ratio between the active and the inactive period being essential to the froth quality.

The invention makes provision here such that the total duration of the first phase is dependent upon the volume of the milk to be processed.

The steam lance according to the invention for implementing the method is characterized in that this steam lance is composed of at least two pipelines and an end piece with outlet openings for the media conveyed through the steam lance, preferably only steam being able to be supplied by the one pipeline, and a steam/air mixture by the other pipeline, and the outlet openings being designed such that the media passing out of them collide immediately after leaving the steam lance.

It is thus ensured that the two media conveyed by the steam lance can collide with one another immediately after leaving the steam lance. It is advantageous here if the outlet opening of the two pipelines is preferably inclined by approx. 70° or by approx. 15° to the horizontal.

The steam lance is provided with a very compact structure which is robust and guarantees a high degree of operational reliability. Despite its compactness, it may nevertheless also be provided with a milk or milk froth temperature sensor located centrally in the inner pipeline for the temperature-dependent control of the milk froth generating device.

Advantageously, the steam lance is suitable both as a component of an independently working milk froth generating unit and as an integral component of an automatic coffee machine for preparing drinks that contain milk froth.

BRIEF DESCRIPTION OF THE DRAWINGS

In the following the invention is described in more detail by means of an exemplary embodiment with reference to the drawings. These show as follows:

FIG. 5 is a partial section of the front region of the steam lance according to FIG. 4a.

DETAILED DESCRIPTION OF THE INVENTION

Figure 1:
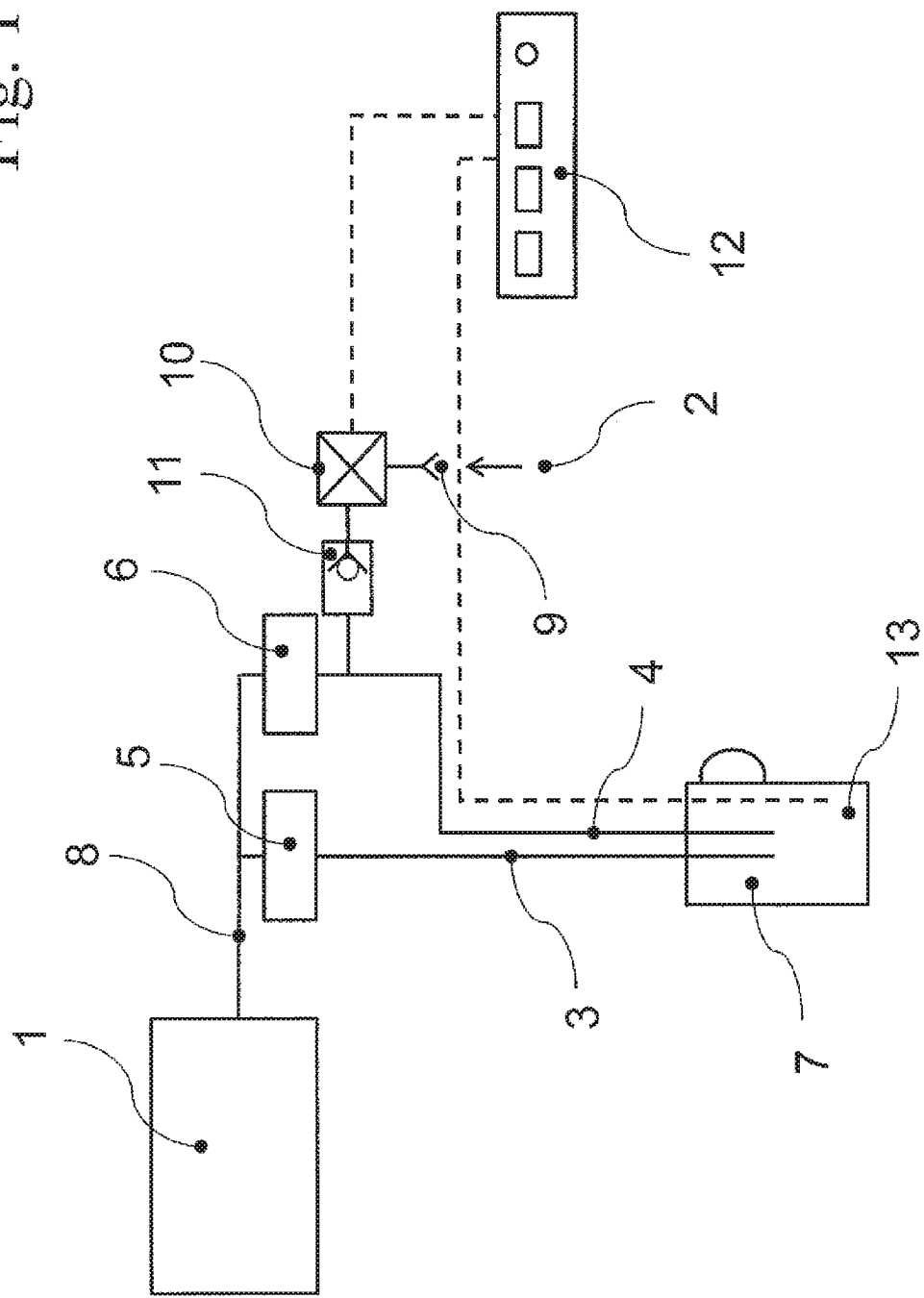
FIG. 1 is a diagrammatically illustrated milk froth generating device working by the method according to the invention.

The milk froth generating device according to FIG. 1 consists of a boiler 1, a compressed air source 2, two supply lines 3, 4 which are separated from one another and have control valves 5 and 6, and a steam lance (not shown) which forms the outlet ends of the supply lines 3, 4 and can be immersed in a vessel 7 containing milk, in particular in a milk jug.

Water vapor is prepared in the boiler 1 with an operating pressure of approx. 1.9 bar, which water vapor is supplied by one pipeline 8 to the two supply lines 3, 4. The supply line 4 is additionally connected to the compressed air source 2 by an air pressure regulator 9, a compressor 10 and a check valve 11.

The device is controlled by a control unit 12 which is connected with control technology both to the control valves 5, 6 and to the compressor 10 as well as to a temperature sensor 13 immersed in a milk vessel 7.

By means of the supply line 3, referred to in the following as the steam line, one only supplies steam the vapor velocity of which is high enough to sufficiently destroy the protein molecules of the milk that is to be frothed.

The supply line 4, referred to in the following as the steam/air line, on its part serves to mix into the milk the proportion of air required to form bubbles, the steam serving as the carrier here in order to convey the air better into the milk.

In turn, the object of the compressor 10 is to generate a constant air pressure in order to mix the air into the steam. The amount of air can be changed by an air regulator 2. In this way, the porosity of the milk froth can be adjusted.

The temperature sensor 13 measures the current temperature of the milk or the milk froth and passes this information on to the control unit 12 which takes over the control of the entire process dependently upon time and temperature.

Figure 2:
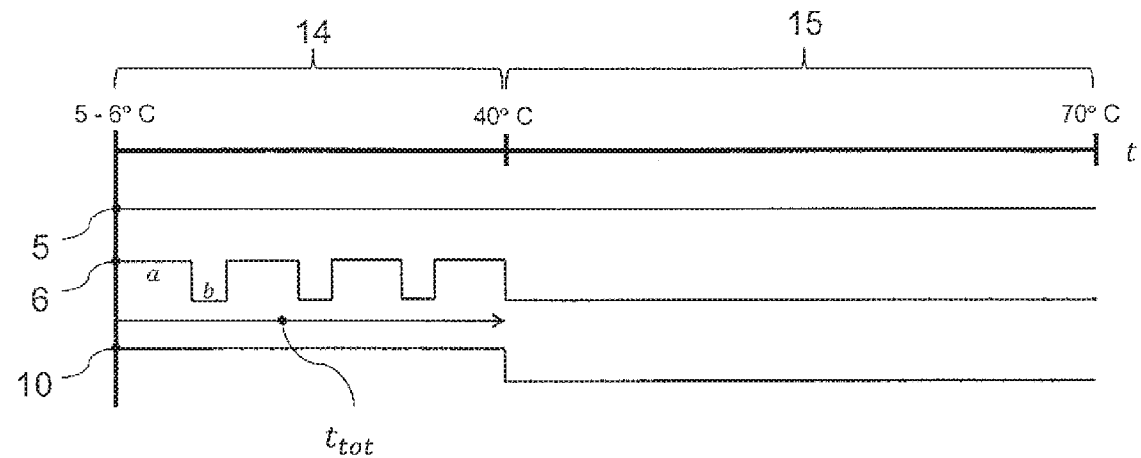
FIG. 2 is a control diagram of the device according to FIG. 1.

As can be seen from FIG. 2, this takes place by switching the valves 5, 6 on and off, in a first phase 14 both valves and the compressor 10 being switched on, and so both the steam line 3 as well as the steam/air line 4 being active, whereas in a second phase 15 the valve 6 and the compressor 10 are switched off so that then only the steam line 3 is active and only steam is supplied to the milk.

In order to improve the milk swirl, the steam/air line 4 which is active in the first phase 14 is activated cyclically, in each cycle the ratio of a to b between the active period and the inactive period preferably being 3 to 1. The number of cycles per phase gives the overall duration of this phase which is dependent upon the volume of milk that is to be processed. At the start of the first phase, one proceeds from a milk temperature in the cooling range of 5 to 6° C. This is increased at the end of this phase to approximately 40° C. and is maximum 70° C. at the end of the second phase. This final temperature of the milk froth may not be exceeded because above this value, the protein of the milk starts to coagulate and so the milk froth dissolves. In principle, more than two phases could also be provided.

Figure 3:
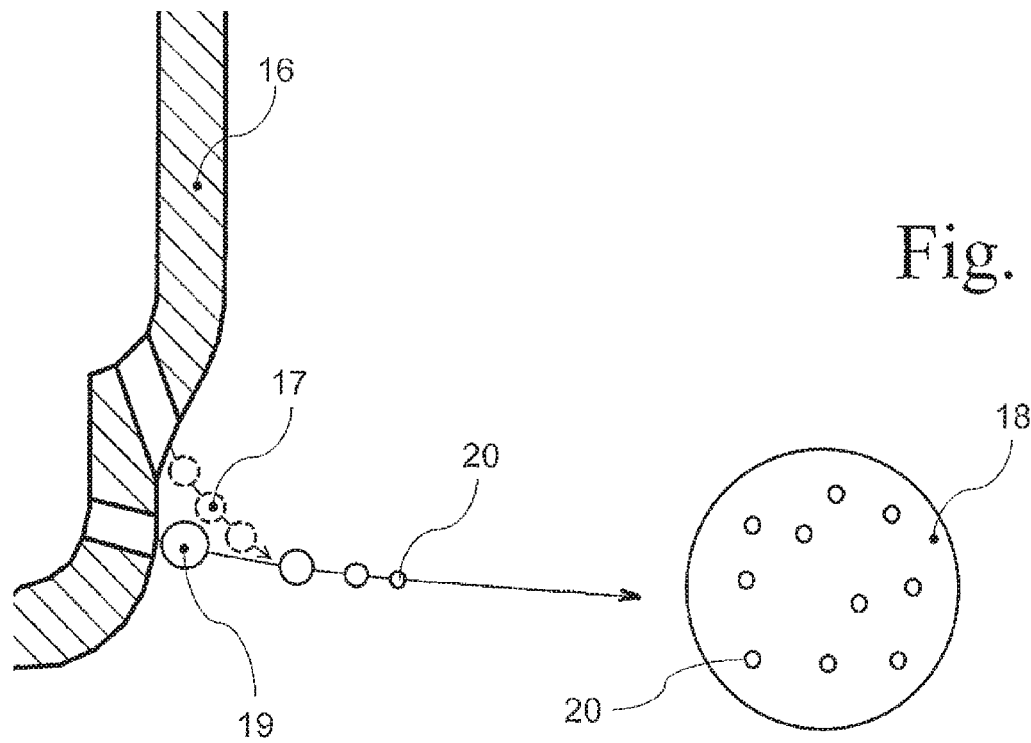
FIG. 3 is a diagram of the construction process for producing the milk froth.

The production of milk froth according to the invention is diagrammatically illustrated in FIG. 3. In order to promote the formation of milk froth, the steam 17 passing out of the steam lance 16 is injected into the milk at high velocity in order to break up the protein molecules 18 of the milk and to generate the milk so that it is viscid. The faster the steam is injected, the more finely the air bubbles 20 produced from the steam/air mixture 19 are dissipated within the milk froth.

The steam lance 16 according to the invention according to FIGS. 4a to FIG. 6 is composed of two pipelines 21, 22 arranged coaxially to one another and an end piece 23 separating them from one another in the outlet region in a gas-tight manner and which has outlet openings 24, 25 for the media of steam and air conveyed through the steam lance, only steam being conveyed through the outer pipeline 21 and the steam/air mixture being conveyed through the inner pipeline 22.

Figure 5:
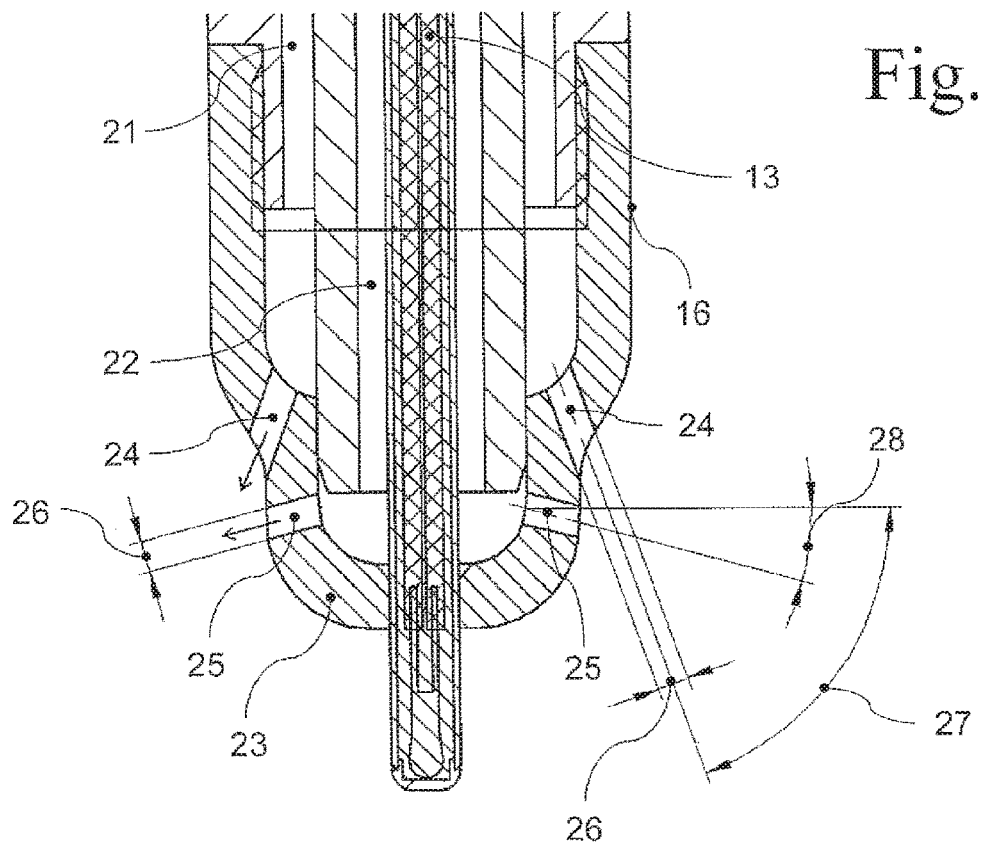
Figure 6:
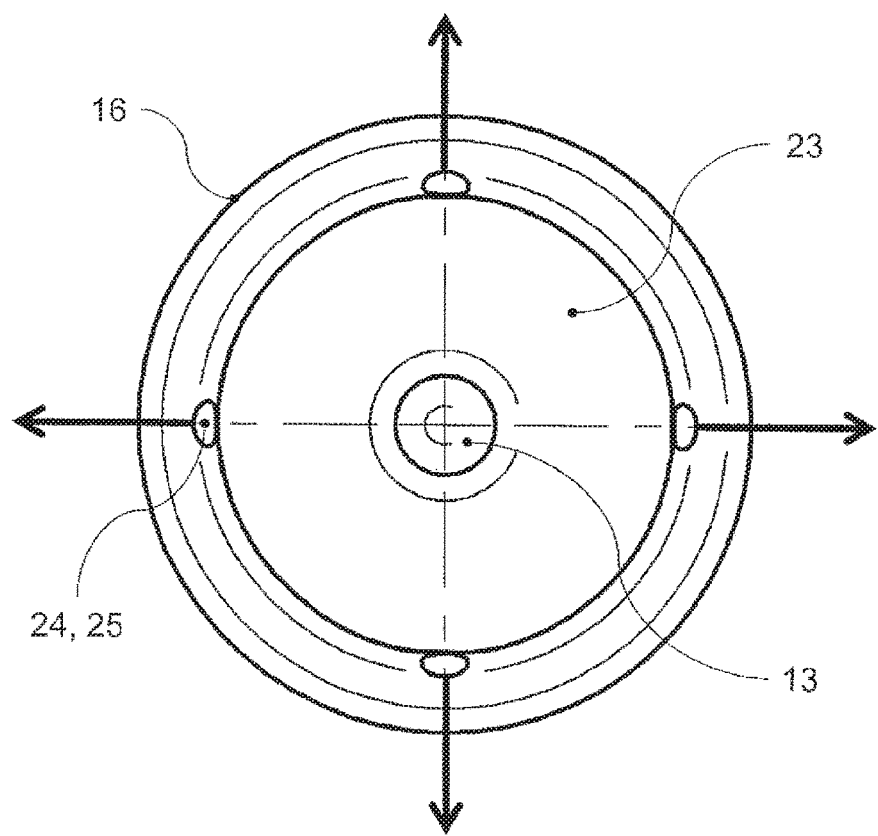
FIG. 6 is a view from below of the steam lance according to FIG. 5.

As can also be seen from FIG. 5 and FIG. 6, the outlet openings 24, 25 are arranged in pairs approximately in a plane running through the longitudinal axis of the steam lance. Here they are made in the form of annularly arranged nozzles 26 with a diameter of approximately 1.5 mm and which are inclined horizontally and also relative to one another. In the exemplary embodiment that is described, the angles of inclination 27, 28 are 70° and 15°, respectively, so as to ensure that the two media of steam and steam/air mixture can collide with one another immediately after passing out of the steam lance 16. The colliding effect at the intersection point brings about optimized mixing of the air bubbles 20 with the protein molecules 18 of the milk and so makes an important contribution to optimizing the quality of the milk froth that is generated.

The construction of the steam lance also makes it possible to position the temperature sensor 13 of the control device centrally within the inner pipeline 22 of the steam lance, projecting out of the end piece 23 on the face side.

Figure 4A:
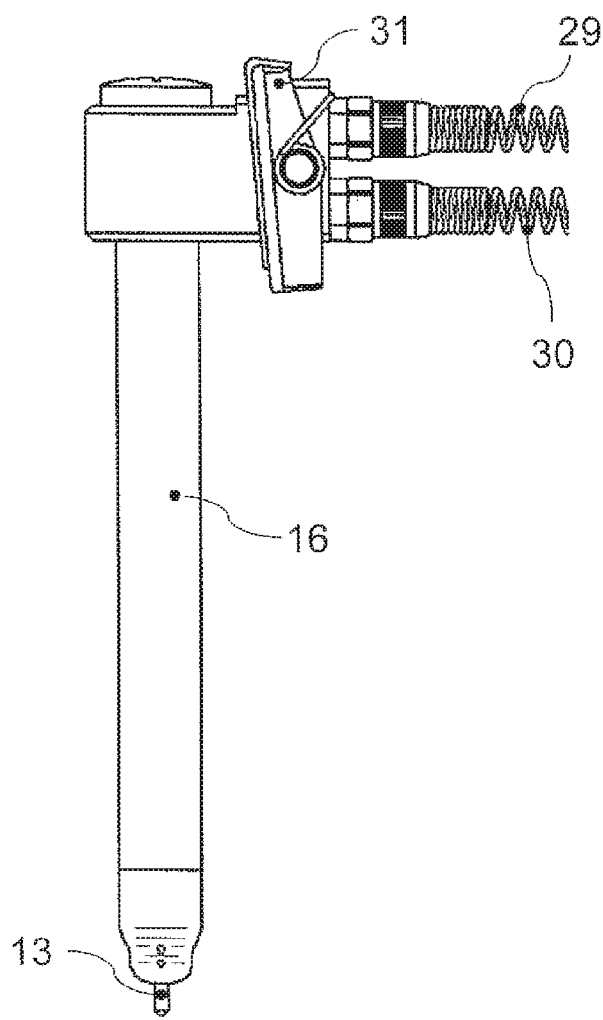
FIGS. 4a and 4b are a steam lance according to the invention, shown in two side views.
Figure 4B:
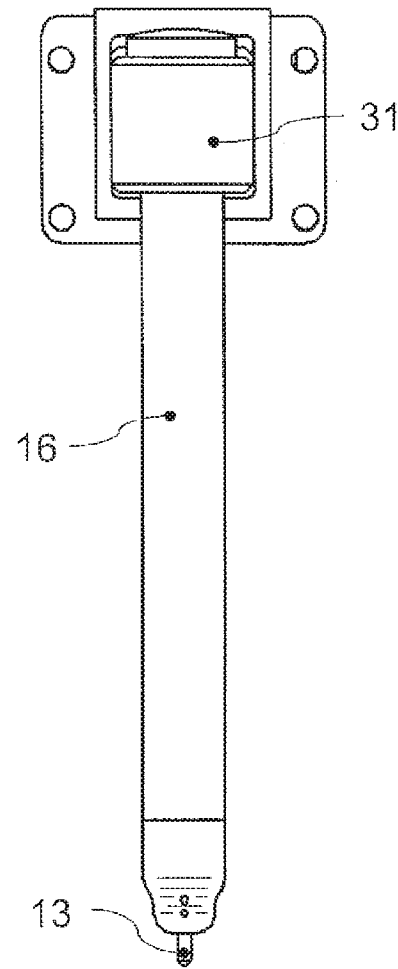

As can be seen from FIG. 4a and FIG. 4b, the steam lance 16 can be connected to hose lines 29, 30 of the milk froth generating device which make it possible to move the steam lance away from the device within a specific range and so to use them independently of a fixed location of the milk vessel. A holder 31 serves to fasten the steam lance to the milk vessel or to the outer housing of the device.

The steam lance 16 is a component part of a milk froth generating device which can work autonomously, i.e. independently of an automatic coffee machine or some similar machine that generates milk froth drinks. However, it is easily possible to integrate the steam lance 16 into a machine which then takes over the preparation of the two media of steam and steam/air mixture for the generation of the milk froth. In principle two steam/air mixtures could also be provided.

The steam lance could theoretically be designed with more than two pipelines, for example in order to blow in a different amount of steam/air.

The invention claimed is:

1. A method for generating milk froth, comprising:
   supplying steam through a first supply line to a first outlet from a steam lance immersed in milk,
   supplying a mixture of steam and added air through a second supply line to a second outlet from the steam lance immersed in the milk, the second supply line being separated from the first supply line up to the first and second outlets from the steam lance,
   generating milk froth by mixing the steam and added air mixture from the second supply line with the steam from the first supply line only in the milk such that the mixing is external to the first and second outlets.

2. The method according to claim 1, further comprising directing the steam from the first outlet of the steam lance at the same time as the steam and added air mixture is directed from the second outlet of the steam lance to cause the steam and the steam and added air mixture to collide immediately after leaving the steam lance, whereby the colliding effect brings about optimized mixing of air bubbles with protein molecules of the milk.

3. The method according to claim 1, wherein the supplying of the steam and the steam and added air mixture is controlled time-and temperature-dependently, and the method further comprises a first phase wherein both the first and the second supply lines are active to supply the steam and the steam and added air mixture to the milk, and a second phase wherein the second supply line is inactive and the first supply line is active and only steam is supplied to the milk through the first supply line.

4. The method according to claim 3, wherein the second supply line is activated cyclically in the first phase.

5. The method according to claim 3, wherein the total duration of the first phase is dependent upon a volume of the milk that is present.

6. The method according to claim 4, wherein in each cycle, the ratio between the active and the inactive period is three to one.

7. The method according to claim 1, wherein the steam is directed from the first outlet of the steam lance simultaneous with the steam and added air mixture being directed from the second outlet of the steam lance.

8. The method according to claim 1, further comprising:
providing a boiler as a source of steam;
deriving first and second flows of steam from the boiler, the first flow of steam being supplied to the first supply line and the second flow of steam being supplied to the second supply line; and
directing compressed air into the second supply line prior to the second outlet from the steam lance.

9. The method according to claim 1, further comprising supplying the steam in the first supply line with a vapor velocity that breaks up the protein molecules in the milk.

10. The method according to claim 1, further comprising controlling the amount of air mixed into the steam in the second supply line to control the porosity of the milk froth.

11. The method according to claim 1, further comprising:
directing the steam from the first supply line into the milk from the first outlet at an end of a first pipeline in the steam lance; and
directing the steam and added air mixture from the second supply line into the milk from the second outlet at an end of a second pipeline in the steam lance, the first and second pipelines being coaxial and the second pipeline being inward of the first pipeline.

12. The method according to claim 11, further comprising creating a colliding effect during flow of the steam from the first outlet at the end of the first pipeline and the steam and added air mixture from the second outlet at the end of the second pipeline by arranging each of a plurality of outlet openings of the first pipeline in an aligning pair with a respective one of a plurality of outlet openings of the second pipeline.

* * * * *